(12) United States Patent
Dul

(10) Patent No.: US 6,391,133 B1
(45) Date of Patent: May 21, 2002

(54) METHOD AND APPARATUS FOR CONTROLLING HEAT BONDING

(75) Inventor: Richard Nicholas Dul, Nottingham (GB)

(73) Assignee: Mirical Emblems Ltd., Blidworth (GB)

( * ) Notice: Subject to any disclaimer, the term of this patent is extended or adjusted under 35 U.S.C. 154(b) by 0 days.

(21) Appl. No.: 09/508,638

(22) PCT Filed: Sep. 15, 1998

(86) PCT No.: PCT/GB98/02742

§ 371 Date: Jul. 13, 2000

§ 102(e) Date: Jul. 13, 2000

(87) PCT Pub. No.: WO99/14030

PCT Pub. Date: Mar. 25, 1999

(30) Foreign Application Priority Data

Sep. 17, 1997 (GB) .............................................. 9719782

(51) Int. Cl.⁷ .............................................. B29C 65/02
(52) U.S. Cl. .................. 156/64; 156/228; 156/359; 156/583.1
(58) Field of Search .................. 156/64, 228, 359, 156/580, 583.1

(56) References Cited

U.S. PATENT DOCUMENTS

| | | | |
|---|---|---|---|
| 4,286,391 A | | 9/1981 | Gerry .............................. 34/44 |
| 5,439,539 A | | 8/1995 | McLean ........................ 156/64 |
| 5,472,549 A | * | 12/1995 | Jurrius et al. ................ 156/311 |
| 5,578,159 A | * | 11/1996 | Miyashita et al. ........... 156/358 |
| 5,616,199 A | * | 4/1997 | Jurrius et al. ................. 156/64 |
| 5,635,014 A | * | 6/1997 | Taylor .......................... 156/358 |
| 5,789,722 A | * | 8/1998 | Zimmerman et al. ........ 219/486 |

FOREIGN PATENT DOCUMENTS

| | | |
|---|---|---|
| GB | 1265009 | 3/1972 |
| GB | 1429016 | 3/1976 |
| WO | WO 89/07045 | 1/1988 |

OTHER PUBLICATIONS

European Patent Office; Patent Abstracts of Japan; Oct. 6, 1987; Motoyama Teruo; Thermocompression Bonding Working Device; Abstract.
Lotus Italia S.n.c., undated, Lotus Italia, brochure, 6 pages.
Heat Fusion Machines, undated, Transfer Machines, brochure, 2 pages.
A Adkins Ltd., undated, AAdkins, brochure, 20 pages.
Classic Gold, undated, brochure, 4 pages.

* cited by examiner

Primary Examiner—James Sells
(74) Attorney, Agent, or Firm—Oppenheimer Wolff & Donnelly LLP

(57) ABSTRACT

The invention provides an apparatus and method for controlling a heat bonding process in a heat bonding apparatus. The temperature is sensed at an interface between the pressing means and the article to be pressed and a signal processing means detects a rapid change in temperature at the interface to provide a start-of-cycle signal indicating initiation of the heat bonding cycle. The signal processing means then detects the attainment of pre-set temperature reached at the interface to provide an end-of-cycle signal signifying the completion of the heat bonding cycle. The heat bonding apparatus may comprise a heat seal press, a heat fusion machine, apparatus for transfer printing and fusion, apparatus for hot melt printing, thermal fixing apparatus, apparatus for the lamination of, for example, two substrates via hot melt adhesives in which the substrates are held in position by means of clamps or frames, and moulds for the curing of materials, such as, for example, rubber.

17 Claims, 3 Drawing Sheets

METHOD AND APPARATUS FOR CONTROLLING HEAT BONDING

The invention relates to a method and apparatus for controlling heat bonding, particularly but not exclusively for controlling heat bonding carried out by means of heat presses for use in, for example, the heat sealing application of badges, labels, transfers etc. to fabric.

Most processes which involve the fusing or curing of products by the use of heat, such as the heat-sealing application of badges, labels or transfers to fabrics or other materials, the lamination of, for example, two substrates via hot melt adhesives, or the curing of materials, such as, for example, rubber, are achieved at present through the controlled use of heat within a prescribed time.

Existing heat bonding or sealing machinery uses a dwell timing device to control the sealing/transfer cycle. Heat is applied by conduction from a pre-heated platen being placed on top of the item to be sealed, transfer printed or otherwise bonded. The products used in heat bonding or sealing typically incorporate a heat-activated "adhesive" coating (or laminate) or the product itself may incorporate a heat activated ingredient which allows it to be transferred from a carrier to a fabric or other material. Depending upon the composition of the heat seal product (and to some extent the material to which it is to be affixed) a temperature has to be achieved which is sufficient to activate the adhesive element and so effect a bond to the material.

Manufacturers of such heat bonding and heat sealable products provide recommendations in respect of temperature/time and pressure which take into account some of the shortcomings of the equipment. Thus, a recommendation of 200° C. for 10 seconds provides only approximate conditions at the interface of product and fabric since various factors (such as the temperature or moisture content of the fabric and the temperature of the base platen) will affect the temperature actually achieved at the interface within any timescale less than that required for the top platen to bring the fabric and base up to its operating temperature. The recommended time given assumes that enough heat is transferred from the plate to melt the adhesive, which results in products being submitted to wide temperature variances during application, which is not an optimum situation. In early runs with the machine, heat will be transferred to the surroundings, which may result in insufficient heat being applied to the product. Alternatively, in later runs, the time given may be in excess of that needed for optimum operation, resulting in overheating of the heat-bonding product or inefficient use of the machinery. The problem can be reduced by heating both plates but this adds to the cost without completely solving the problem.

GB patent no. 1,265,009 discloses a textile pressing machine in which the bonding of sheets of fabric is controlled by a timer. The device further includes a surface temperature sensor positioned on the unheated face of the press and, after a pre-set time for the process has been completed, the temperature is sensed and if it has not reached a pre-set temperature then the process is continued until the temperature is reached.

However, this device does not solve the problem of potential excess process time over the optimum.

Additionally, in order to control the temperature to which a product is exposed during the heat sealing process, it is necessary to measure the temperature as close to the "glue line" or bonding area as possible. Known presses used for garment decoration purposes have a heated top platen or may have both platens heated and known temperature sensors are unsuitable for mounting on a heated platen as they measure a preset temperature. Such temperature sensing devices are, therefore, inappropriate for fitting to existing heat presses and thus cannot be retrofitted to existing equipment.

A further problem with prior art devices in which the temperature is measured is that they rely on accurate temperature calibration of the thermostatic control of the press which is directly linked to the preset temperature. If the calibration is inaccurate, the temperature attained during the process will also be inaccurate.

It is an object of the present invention to provide more accurate control of the process of a heat bonding apparatus.

The present invention provides an apparatus for controlling a heat bonding process in a heat bonding apparatus comprising pressing means for applying pressure to an article in a heat bonding cycle and heating means to provide heat to the article during the heat bonding cycle, comprising:

means for sensing the temperature at an interface between the pressing means and the article to be pressed; and signal processing means; wherein the means for sensing the temperature at the interface provides signals corresponding to the temperature at the interface to the signal processing means and the signal processing means detects a rapid change in temperature at the interface and provides a start-of-cycle signal indicating initiation of the heat bonding cycle in response to said rapid change in temperature at the interface and, following provision of the start-of-cycle signal, the signal processing means detects the attainment of a pre-set temperature reached at the interface and provides an end-of-cycle signal signifying the completion of the heat bonding cycle in response to said attainment of said pre-set temperature reached at the interface.

The rapid change in temperature detected by the signal processing means indicates the start of the heat bonding cycle. Following the start of the heat bonding cycle, the temperature at the interface rises until it reaches the final pre-set temperature at which the end-of-cycle signal is provided. The signal processing means only provides an end-of-cycle signal when the pre-set temperature is reached following a start-of-cycle signal. This enables the heat bonding cycle to be accurately controlled in that the cycle only starts following the detection of a rapid change in temperature and is not dependent on an operator signalling the start of a cycle.

Preferably the means for sensing the temperature at the interface comprises a temperature sensing device that is small enough so that it does not interfere with the heat bonding process. Preferably the means for sensing the temperature at the interface comprises a temperature sensing device of low thermal mass so as to be capable of detecting very rapid changes of temperature. An example of a suitable temperature sensor is a thermocouple device but any suitable sensor may be used.

The heat bonding apparatus may comprise a heat seal press, a heat fusion machine, apparatus for transfer printing and fusion, apparatus for hot melt printing, thermal fixing apparatus, apparatus for the lamination of, for example, two substrates via hot melt adhesives in which the substrates are held in position by means of clamps or frames, and moulds for the curing of materials, such as, for example, rubber.

In a preferred embodiment, the invention provides an apparatus for controlling a heat bonding process in a heat seal press comprising two platens for applying pressure to an article in a heat bonding cycle and heating means to heat at least one of the platens to provide heat to the article during the heat bonding cycle. The apparatus preferably comprises a temperature sensor arranged between the platens and the signal processing means comprises a sensor processing unit. Advantageously the temperature sensor is attached to the inward facing side of a heated, higher temperature, platen and the sensor processing unit responds to a rapid drop in temperature to provide a signal to indicate the start of the heat bonding cycle.

Alternatively the temperature sensor may be attached to the inward facing side of the unheated or lower temperature platen or arranged between the platens, in which cases the sensor processing unit responds to a rapid rise in temperature to provide a signal to indicate the start of the heat bonding cycle.

When the temperature sensor reaches a pre-set second temperature, the sensor processing unit provides an end-of-cycle signal signifying the completion of the heat bonding cycle in response to said second signal.

Advantageously, for a manually operated heat bonding apparatus, the sensor processing unit may provide an audible or visual alarm to indicate to an operator that the heat bonding cycle is complete, or, for an automatic heat bonding apparatus, the sensor processing unit may provide an end-of-cycle signal to lift the platen automatically.

Advantageously the pre-set temperature can be set depending on the materials used.

Advantageously, for a manually operated heat bonding apparatus, when the sensor processing unit detects a further rapid change in temperature after the end-of-cycle signal, a signal is produced to switch off the alarm. The next rapid change in temperature then indicates the start of the next cycle.

The apparatus according to the invention may comprise an integral part of the control mechanism of a heat bonding apparatus or may comprise a stand alone device which can be fitted to a heat bonding apparatus.

The invention further provides a method of controlling a heat bonding process in a heat bonding apparatus comprising pressing means for applying pressure to an article in a heat bonding cycle and heating means to provide heat to the article during the heat bonding cycle, comprising the steps of:

sensing the temperature at an interface between the pressing means and the article to be pressed;

providing a first signal corresponding to a rapid change in temperature at the interface;

providing a start-of-cycle signal signifying initiation of the heat bonding cycle in response to said first signal;

following provision of the start-of-cycle signal, providing a second signal corresponding to a pre-set temperature reached at the interface; and providing an end-of-cycle signal signifying the completion of the heat bonding cycle in response to said second signal.

Preferably the method includes the step of providing an alarm in response to the end-of-cycle signal. For a manually operated machine, this may be an audible or visible alarm to indicate to an operator that the cycle is complete. Alternatively, for an automatically operated machine, the method may include the step of providing a signal to the operating mechanism of an automatically operated machine to automatically end the cycle.

Advantageously, for a manually operated machine, the method includes the step of detecting a further rapid change in temperature after the end-of-cycle signal as a result of the retraction of the heating and pressing means and providing a signal in response to the further rapid change to switch off the alarm.

The present invention controls the process cycle by reference to the actual temperature at the interface. This is achieved by placing a temperature sensor linked to an electronic alarm device which alarms at the achievement of a pre-set desired temperature. The alarm may be an audible buzzer or flashing light (in the case of a manually operated machine) or a signal sent to the operating mechanism in the case of an automatically operated machine.

The present invention measures the actual temperature of the interplaten margin and predicts the successful application of the heat bonded product in terms of the actual inter-platen temperature attained, rather than, as is the case presently, through the time that the process should take, since this time (the dwell time) varies significantly as a result of factors which are outside the effective control of existing heat presses and operators of such presses.

The device of the present invention monitors the temperature of the interplaten margin independently of the thermostatic control of the platen and thus overcomes any potential problems that may be associated with inaccurate calibration of the machine by providing a known rather than an assumed temperature exposure for the article in the press. The device of the present invention has the added advantage that it can be used to check the calibration of a pressing machine.

Factors such as ambient temperature, product temperature, fabric moisture content, heated platen temperature and the frequency of operation will affect the dwell time necessary to expose the product to a pre-set temperature.

The invention will now be described, by way of example only, with reference to the accompanying drawings, of which:

Figure 1:
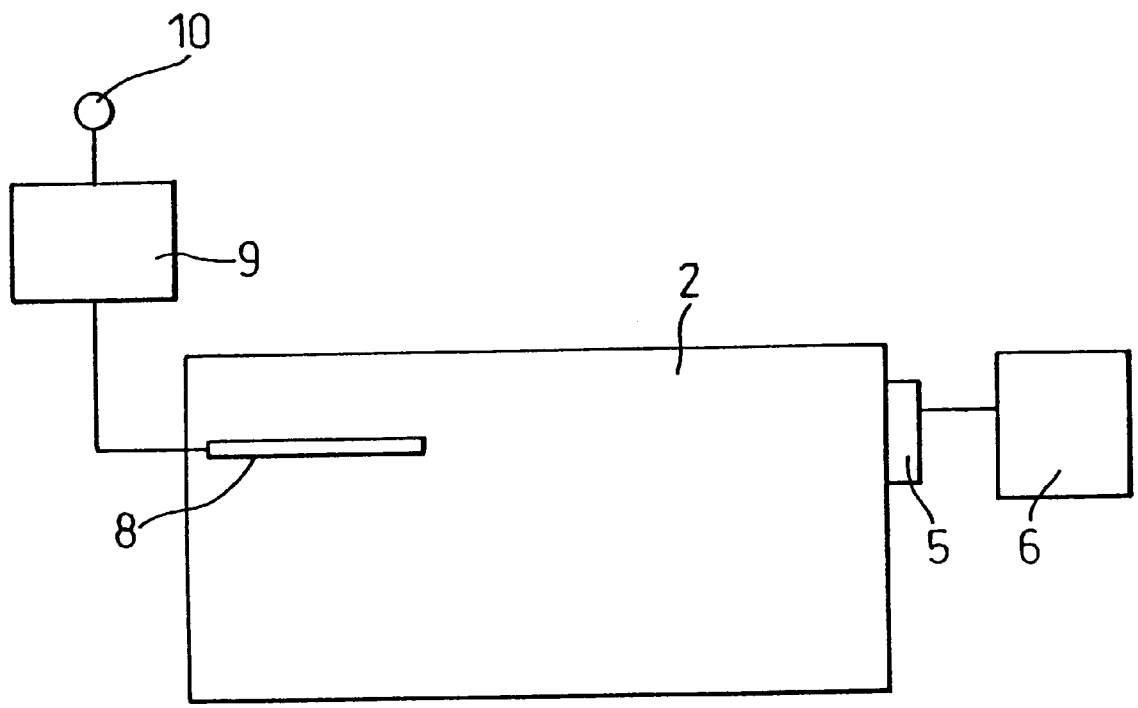
FIG. 1 shows a schematic representation of a heat bonding apparatus with an apparatus for controlling the heat bonding process in accordance with the present invention.
Figure 1:
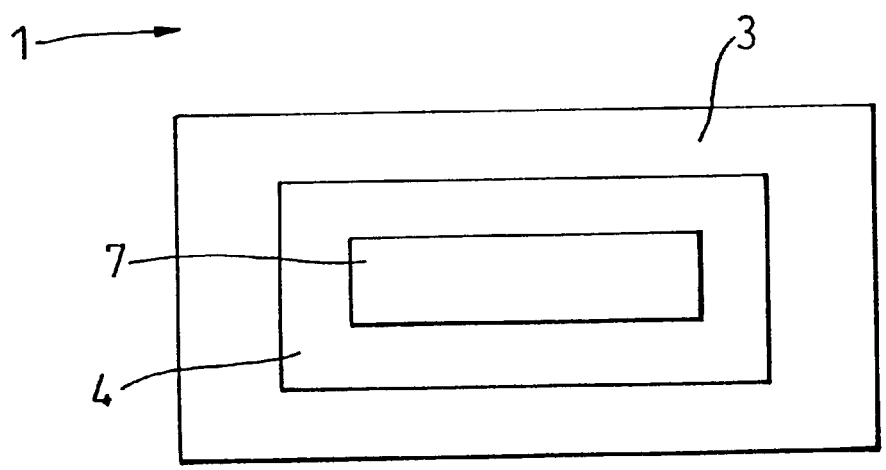

As shown in FIG. 1, a heat bonding apparatus 1 comprises two pressing means 2,3 which are used to compress an article 4 between them. The pressing means may be platens, formers, moulds, rollers or other pressing means. In the embodiment shown, the pressing means 2,3 are two platens. The top platen 3 is heated by heating means 5 controlled by a controller 6. The controller 6 enables the temperature of the platen 2 to be adjusted and, when used without the present invention, also controls the start and end of the heat bonding cycle, via control of the dwell time, and the temperature of platen 2.

The article 4 and a heat sealable element 7 are placed on the lower platen 3.

A temperature sensor 8 is attached to the inner surface of the upper platen 2 and is connected to a sensor processing unit 9. The sensor processing unit 9 receives information from the sensor 8 and uses the temperature information received to generate a start-of-cycle signal and an end-of-cycle signal.

The temperature sensor 8 is small enough so that is does not interfere with the heat bonding process and has a low thermal mass so that it is capable of detecting rapid changes in temperature. The sensor 8 is attached to the surface of the heated platen 2 and thus measures the surface temperature of the platen 2.

In operation, the platens 2,3 are brought together to apply heat and pressure to the article 4 and heat sealable element 7. When the platens 2,3 are brought together to start the heat bonding process, the surface temperature of the heated platen 2 rapidly decreases towards that of the material of the article 4 on the base platen 3. This rapid change in temperature is used by the sensor processing unit 9 to signal the start of the process. As the platens 2,3 are held together, the temperature at the interface between the platens 2,3 rises. When a pre-set temperature level, as determined by the required bonding temperature of the process, is attained and received by the sensor processing unit 9, the sensor processing unit 9 signals the completion of the process.

The sensor processing unit 9 only provides a signal indicating the completion of the process when the attainment of the pre-set temperature is detected subsequent to the provision of the signal indicating the start of the process in response to the rapid change of temperature. Thus, erroneous end-of-cycle signals can be avoided as the end of the process is only indicated following the indication of the start of the process.

As the sensor processing unit 9 uses changes in temperature to identify the start of the cycle, any erroneous signals during warm up or cool down of the platens, for example at the start or end of the day or when the preset temperature is changed, can be avoided.

The sensor processing unit 9 interprets the information received from the sensor 8 and utilises it to trigger the start and finish of the process. When the pre-set temperature level is attained, an end-of-cycle signal is produced. In the case of a manually operated machine, the end-of-cycle signal triggers an alarm 10. This may be a buzzer or flashing light, for example. In the case of an automatically operated machine, the sensor processing unit provides a signal to lift the platen automatically.

A further rapid rise in temperature at the sensor 8 indicates that the platen 2 has been lifted. The sensor processing unit 9 responds to this further rapid rise in temperature at the sensor 8 to provide a signal to turn off the alarm 10, or in the case of an automatic press, to close the circuit, so enabling a subsequent cycle to be commenced.

The sensor processing unit 9 has adjustment means (not shown) to enable the pre-set temperature and the rate of temperature change which triggers the start and finish of the cycle to be adjusted to suit differing operating requirements as required by different materials and/or processes.

The sensor processing unit 9 may also include signal means (not shown) to indicate, for example, if the article 4 has been exposed to excessive heat as may adversely affect the product'performance, or conversely if it has been exposed for an insufficient duration to effect, for example, a chemical reaction, as in the case of curing.

Figure 2:
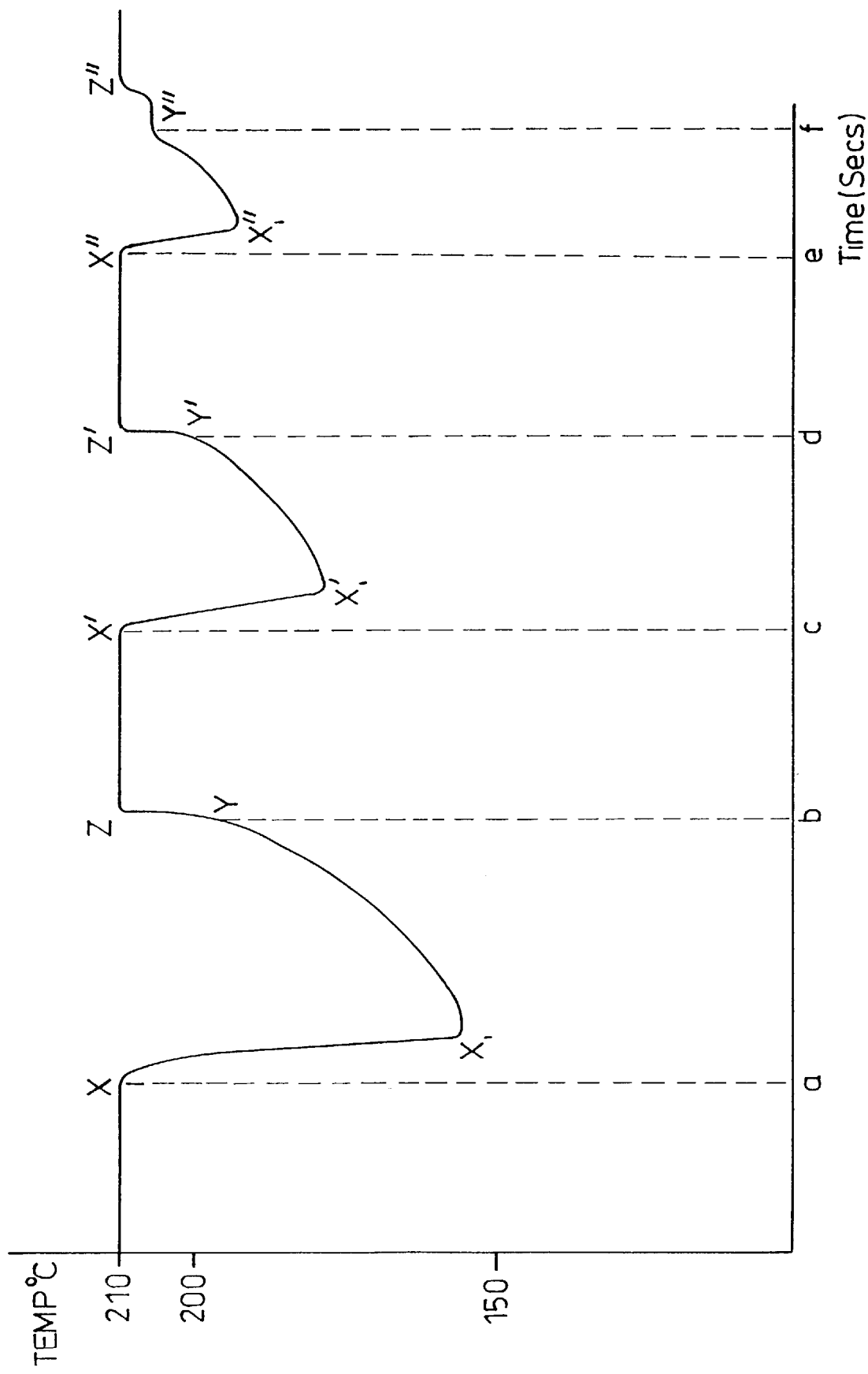
FIG. 2 is a graph illustrating a typical temperature/time curve for operation of a heat bonding apparatus with an apparatus for controlling the heat bonding process in accordance with the present invention.

FIG. 2 illustrates a typical temperature/time graph as recognised by the sensor processing unit 9 of FIG. 1. The sensor 8 is applied at the heated platen 2 at 210° C., the pre-set temperature is 200° C. and the platens 2,3 are brought together three times with a 10 second interval between cycles.

The start of the process is indicated at X. Here the two platens 2,3 are brought together and the sensor 8 is held at the interface of the platen 2 and the article 4. The temperature on the face of the platen 2 drops rapidly as heat is dissipated to the lower platen 3, the article 4 and the surroundings. The temperature begins to rise again at $X_1$ and eventually reaches the pre-set temperature at Y. This indicates the completion of the process. The platen 2 is lifted from the article 4 and lower platen 3 and a further sudden rise in temperature, as indicated at Y–Z is sensed by the sensor 8. This provides an indication that the platen has been retracted.

The article 4 will then be removed and the next article placed on the lower platen 3. The two platens 2,3 are brought together again and the start of the second cycle of the process is indicated at X'. It can be seen that the drop in temperature from X' to $X_1$' is much less than the corresponding drop in temperature from X to $X_1$. It thus takes less time for the pre-set temperature to be achieved at Y'.

The start of the third cycle is indicated at X". The drop in temperature from X" to $X_1$" is similarly less than the corresponding drop in temperature from X' to $X_1$' and hence the third cycle takes less time to complete than the second cycle.

The reduction in the process duration is illustrated on the graph on which b-a>d-c>f-e, where c-b and e-d=10 seconds.

The third cycle illustrates the temperature curve in the event that the upper platen 2 is not retracted immediately on completion of the process. The plateau at Y" indicates a delay, of for example 1 second, in retraction of the upper platen 2.

The graph illustrates the reducing cycle time with successive cycles, enabling shorter times to be used for successive cycles, under accurate control of the sensor processing unit. This enables the cycle times to be optimised, with consequent energy and cost savings.

Figure 3A:
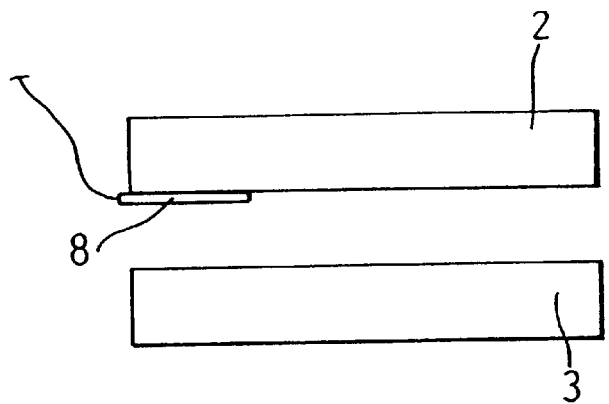
FIGS. 3a, b and c illustrate alternative arrangements of the temperature sensing means of an apparatus for controlling the heat bonding process in accordance with the present invention.
Figure 3B:
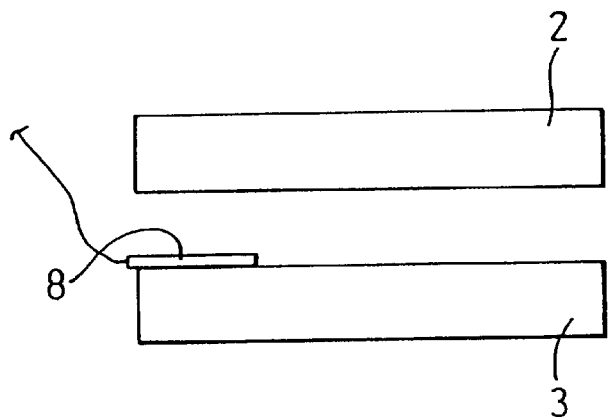
Figure 3C:
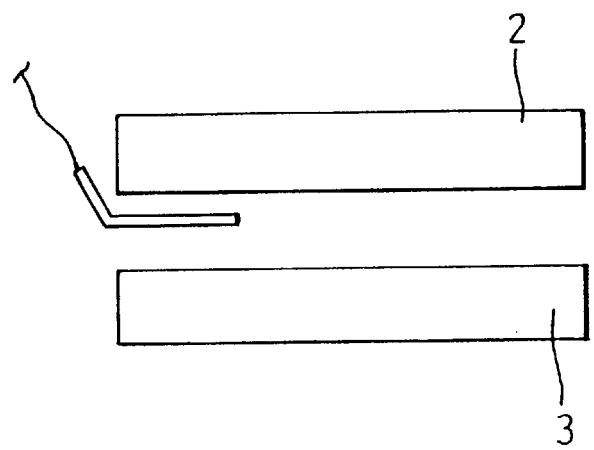

FIGS. 3a to c show alternative arrangements of the temperature sensing means of an apparatus for controlling the heat bonding process in accordance with the present invention.

FIG. 3a illustrates the arrangement as shown in FIG. 1. The sensor 8 is attached to the face of the heated platen 2 and when the platens 2,3 are brought together, the sensor 8 senses the rapid drop in temperature of the face of the platen 2.

FIG. 3b illustrates an alternative arrangement in which the sensor 8 is placed on the platen 3. This platen 3 is either unheated or providing only background heat (to reduce the range of dwell times necessary to ensure the process is completed satisfactorily). In this arrangement, the sensor 8 senses a rapid rise in temperature as heat is transferred from the heated upper platen 2. As with the arrangement shown in FIGS. 1 and 3a, the process is completed when the temperature measured by the sensor 8 reaches the pre-set level. In the case of heat bonding to a fabric, for example, the pre-set temperature level will be at or above the melt temperature of the adhesive employed.

FIG. 3c illustrates a further alternative arrangement in which the sensor 8 is located between the platens 2,3 such that it is brought into contact with both surfaces of the platens 2,3 when they are brought together and such that it returns to an inter-platen position when the process is completed. As with the arrangement shown in FIG. 3b, the start of the cycle occurs when the sensor 8 detects a rapid increase in temperature and is completed when it reaches a pre-set level.

The arrangements of FIGS. 3a,b and c illustrate how the present invention is not limited to use on the cold platen of a press as it recognises changes in temperature to indicate the start of a cycle. In addition, the interplaten temperature should ideally be measured as close to the glue line as possible. In practice, all presses used for garment decoration have a heated top platen while some also have a heated base platen as well. The present invention can be used effectively with the sensor 8 arranged on the heated or unheated platen or where both platens are heated.

Although the invention described herein has been described with respect to the heat fusing process as it applies to the application of heat sealable or transferable products to a material, the principle is applicable to many other processes where heat is employed, for example the lamination of, for example, two substrates via hot melt adhesives, or the curing of materials, such as, for example, rubber, which are achieved through the controlled use of heat.

The apparatus and method of the invention enable the heat bonding process to be controlled depending on the temperature cycle of the process, with no reference to set dwell times.

The apparatus and method of the invention work effectively with manually or automatically operated presses. A further advantage of the present invention, because it utilises changes in temperature to identify the start and end of a cycle, is that there is no need to provide a cooling air jet to the temperature sensor to reset the press for further use.

The apparatus and method of the invention provide many advantages including more accurate process control, elimination of product failures resulting from under or over exposure to heat and increased productivity through the utilisation of the build up of heat in the heat bonding apparatus. The apparatus and method of the invention may also be used to provide a secondary check on the operating temperature of the heated platens of the press itself.

The apparatus and method of the invention can be operated at any preset temperature. The apparatus of the invention has the further advantage that it can be retrofitted to existing machines as it can form a stand alone device that can be interconnected with virtually any press presently in use.

What is claimed is:

1. A method of controlling a heat bonding process in a heat bonding apparatus comprising pressing means for applying pressure to an article in a heat bonding cycle and heating means to provide heat to the article during the heat bonding cycle, comprising the steps of:

sensing the temperature at an interface between the pressing means and the article to be pressed;

providing a first signal corresponding to a rapid change in temperature at the interface;

providing a start-of-cycle signal signifying initiation of the heat bonding cycle in response to said first signal;

following provision of the start-of-cycle signal, providing a second signal corresponding to a pre-set temperature reached at the interface; and providing an end-of-cycle signal signifying the completion of the heat bonding cycle in response to said second signal.

2. A method according to claim 1 wherein the method further comprises the step of providing an alarm in response to the end-of-cycle signal.

3. A method according to claim 2 wherein the alarm comprises an audible or visible alarm to indicate to an operator that the cycle is complete.

4. A method according to claim 3 wherein the method includes the step of detecting a further rapid change in temperature after the end-of-cycle signal and providing a signal in response to the further rapid change to switch off the alarm.

5. A method according to claim 4 wherein the method includes the step of detecting a further rapid change in temperature after the end-of-cycle signal and providing a signal to the operating mechanism of an automatically operated machine to automatically end the cycle.

6. Apparatus for controlling a heat bonding process in a heat bonding apparatus comprising pressing means for applying pressure to an article in a heat bonding cycle and heating means to provide heat to the article during the heat bonding cycle, comprising:

means for sensing the temperature at an interface between the pressing means and the article to be pressed; and signal processing means; wherein the means for sensing the temperature at the interface provides signals corresponding to the temperature at the interface to the signal processing means and the signal processing means detects a rapid change in temperature at the interface and provides a start-of-cycle signal indicating initiation of the heat bonding cycle in response to said rapid change in temperature at the interface and, following provision of the start-of-cycle signal, the signal processing means detects the attainment of a pre-set temperature reached at the interface and provides an end-of-cycle signal signifying the completion of the heat bonding cycle in response to said attainment of said pre-set temperature reached at the interface.

7. Apparatus according to claim 6 wherein the means for sensing the temperature at the interface comprises a temperature sensing device that is small enough so that it does not interfere with the heat bonding process and of low thermal mass so as to be capable of detecting very rapid changes of temperature.

8. Apparatus according to claim 6 or claim 7 wherein the apparatus comprises an apparatus for controlling a heat bonding process in a heat seal press comprising two platens for applying pressure to an article in a heat bonding cycle and heating means to heat at least one of the platens to provide heat to the article during the heat bonding cycle.

9. Apparatus according to claim 8 wherein the means for sensing the temperature at the interface comprises a temperature sensor arranged between the platens and the signal processing means comprises a sensor processing unit.

10. Apparatus according to claim 9 wherein the temperature sensor is attached to the inward facing side of a heated, higher temperature platen and the sensor processing unit responds to a rapid drop in temperature to provide a signal to indicate the start of the heat bonding cycle.

11. Apparatus according to claim 9 wherein the temperature sensor is is attached to the inward facing side of an unheated or lower temperature platen and the sensor processing unit responds to a rapid rise in temperature to provide a signal to indicate the start of the heat bonding cycle.

12. Apparatus according to claim 9 wherein the temperature sensor is arranged between the platens and the sensor processing unit responds to a rapid rise in temperature to provide a signal to indicate the start of the heat bonding cycle.

13. Apparatus according to claim 9 wherein the sensor processing unit provides an audible or visual alarm to indicate to an operator that the heat bonding cycle is complete.

14. Apparatus according to claim 13 wherein the sensor processing unit produces a signal to switch off the alarm in response to a further rapid change in temperature after the end-of-cycle signal.

15. Apparatus according to claim 9 wherein the sensor processing unit provides an end-of-cycle signal to life the platen automatically.

16. Apparatus according to claim 6 wherein the pre-set temperature is set depending on the materials used.

17. Apparatus according to claim 6 wherein the heat bonding process cycle is controlled by reference to the temperature at the interface between the pressing means.

* * * * *